Dec. 29, 1942.  C. R. CARNEY  2,306,778
WINDOW CLEANING DEVICE
Filed March 20, 1940
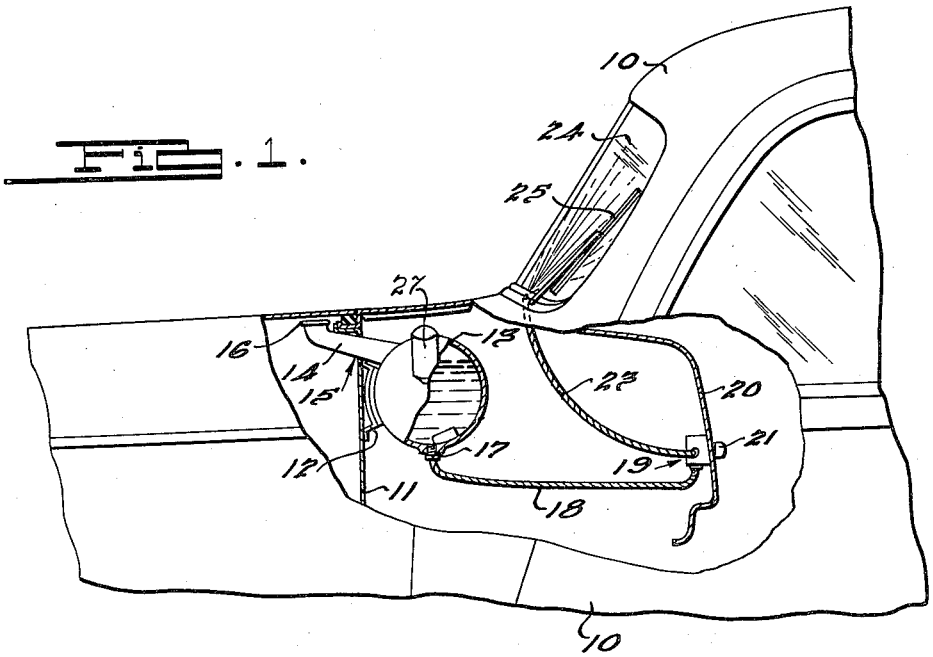
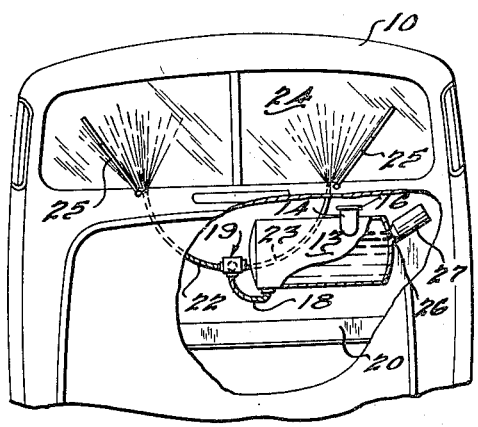
INVENTOR
Clifford R. Carney.
BY Dike, Calver + Gray.
ATTORNEYS.

Patented Dec. 29, 1942

2,306,778

UNITED STATES PATENT OFFICE 2,306,778

WINDOW CLEANING DEVICE

Clifford R. Carney, Detroit, Mich.

Application March 20, 1940, Serial No. 324,921

2 Claims. (Cl. 15—250.4)

The present invention relates to a cleaning device for assisting in clearing accumulated material from the surface of the windshield, or the like, of a motor vehicle.

It is a common experience of operators of motor vehicles that accumulations of dirt, dust, grime, oil and the like often form on the vehicle windshield and seriously impair vision therethrough. Surface-contacting clearing devices for these surfaces, such as windshield wiping blades, do not always effectively remove such accumulated surface-obscuring substances, particularly if such accumulations have dried thereon or are of an oily nature, in either of which events the wiping blades are not effective unless a cleaning fluid also is present. Thus under many operating conditions, such cleaning devices are incperative to remove accumulated materials and to clear a path of vision through the windshield.

Accordingly it is an object of the present invention to provide a novel cleaning device which is economical to install and operate and convenient to use and which is adapted to assure operation of the surface-contacting clearing devices at all times to remove accumulated foreign substances on the windshield and to clear a path of vision therethrough. Further, the device of the present invention is positive and reliable in action and readily controlled to deliver, when desired, predetermined amounts of a cleaning substance to the surface to be cleaned.

Another object of the invention is to provide a cleaning method, apparatus and compound which is particularly useful for clearing a path of vision through transparent surfaces in vehicles, such for example as automotive vehicle windshields, the apparatus being readily controllable from the interior of the vehicle to provide a fluid which assists in the removal of surface-covering substances such as oil, dirt, dust, mud, grime and the like which obstruct clear vision through said transparent surfaces.

A further object of the invention is to provide a cleaning device including apparatus suited to store a fluid cleaner and controlled by the vehicle operator to automatically spray, eject or deliver a fluid cleaner to the surface to be cleaned.

It is a still further object of the invention to provide a surface-cleaning compound useful with conventional types of cleaning apparatus, such for example as a flexible squeegee member, the said compound being stored under sufficient pressures that the cleaning fluid is delivered as desired to the surface to be cleaned. Such cleaning compound may also be provided with an ingredient adapted to prevent freezing thereof and also to prevent or retard the adherence or freezing of water or other substances on the surface treated therewith.

Other objects of this invention will appear in the following description and appended claims, reference being had to the accompanying drawing forming a part of this specification wherein like reference characters designate corresponding parts in the several views, and in which Fig. 1 is a fragmentary side elevation with parts broken away showing a portion of a vehicle body adjacent the windshield and illustrating the present invention as applied to the vehicle body;

Fig. 2 is a fragmentary front elevation with parts broken away showing the embodiment of the invention shown in Fig. 1.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

The present invention is illustrated as applied to a vehicle body 10 having a cowl partition 11. A support or retaining member 12 for the fluid containing means or tank 13 is firmly secured to the cowl partition 11. This support 12 and tank 13, preferably formed from non-corrosive materials, may be of any suitable size and structure. The tank 13 is attached to or mounted on the support 12. It should be understood, however, that the tank 13 may be secured in any other desired manner to any other suitable supporting surface.

A conduit 14 leads to the tank 13 in the manner shown in Fig. 1 and may extend through a suitable aperture indicated at 15 (Fig. 1) in the partition 11 and provides the means for filling the tank. The mouth of the conduit 14 is closed by a suitable closure or cover 16 so that the tank 13 may be sealed after the introduction of materials therein through the conduit 14.

The tank 13 is provided with an opening or aperture 17 preferably positioned near the bottom of the tank. This aperture 17 may be threaded or otherwise suitably made to receive a pipe or conduit 18. This conduit 18 is inserted in the opening 17 to form a fluid-tight joint. The conduit 18 forms a part of a fluid delivery system or fluid lead for conducting fluid stored in the tank 13 to the surface to be cleaned. The conduit 18 leads from the tank 13 to a valve means indicated generally at 19 for controlling the flow of fluid through the conduit system leading from the tank 13. In the particular embodiment shown in Figs. 1 and 2, the valve 19 is manually actuated to controllably open or close the conduit 18. The internal mechanism of the valve means 19 is not shown inasmuch as, per se, it does not constitute a part of the present invention and any desired conventional type of valve may be used. It will be noted that the valve means 19 is mounted adjacent the instrument panel 20 and is provided with a control knob 21 which is thus made readily accessible to the operator of the vehicle. The valve 19, however, may if desired be connected for automatic operation in conjunction with the windshield wiping element.

Branch conduits 22 and 23 lead from the valve means 19 to the surface to be cleaned, which in the present instance is the windshield of the vehicle indicated generally at 24. Each of the branch conduits 22 and 23 terminates in a jet or spray nozzle located at a point adjacent the portion of the windshield which it is desired to clean.

A surface clearing member 25, such as a conventional windshield wiper blade, is provided to clear the surface after the cleaning fluid is applied thereto. Any other suitable surface contacting members may be used in place of such a blade, such as a squeegee member or the like, and may be automatically actuated from the windshield wiper motor or it may be manually operable.

In the tank 13 is placed a suitable cleaning fluid which is adapted to be delivered through the conduit 18, the valve 19, and the branch conduits 22 and 23, and to be ejected or delivered upon the surface of the windshield 24.

The cleaning fluid is caused to flow through the fluid delivery system due to gas pressures in the tank 13. This gas pressure is formed or generated by introducing a gas into the tank 13 together with the cleaning solution.

The tank 13 is provided with an additional aperture 26, preferably located near its upper portion. This aperture is threaded or otherwise suitably formed to receive the lip of a container or cartridge 27. This cartridge 27 contains a liquefied or compressed gas such as $CO_2$. The lip of the cartridge 27 is suitably constructed so that the cartridge may be screwed into the aperture 26 or otherwise firmly fitted thereinto. When the cartridge is thus positioned, it is contemplated that a seal in the lip will be broken and the gas under high pressure theretofore contained in the cartridge 27 will be discharged into the tank 13. It will be readily understood that after this gas has been discharged into the container 13, the fluid therein is stored under pressure so that the apparatus and method operate to supply a cleaning solution to the windshield when the valve 21 is actuated.

A normal cleaning solution for the purpose is water or some aqueous solution. Thus, a preferred gas-generating substance includes as ingredients substances capable of either evolving a gas upon dissolving or reacting with water or an aqueous solution with the evolution of gas. For example, the substance may be one which forms an acid when dissolved in the aqueous cleaning solution. In this instance a carbonate or a bicarbonate is provided in the solution with the result the carbonate or bicarbonate reacts in the presence of the acid with the evolution of carbon dioxide gas. Since the storage container is gas tight, a gas pressure is thus generated therein sufficient to cause the solution to flow from the tank upon actuation of the valve 19. While it is contemplated in this instance that any suitable substance capable of dissolving in water to form an acidic solution may be used, it is particularly recommended that a weak polybasic acid be used inasmuch as such acids have a plurality of replaceable hydrogen ions and therefore generate more carbon dioxide per unit of weight than do acids having less replaceable hydrogen ions. In particular it is recommended that tartaric acid may be used as the acid. In this instance, as a specific example of a suitable gas-generating substance, there is included by way of example but not of limitation the following:

| | Parts by weight |
|---|---|
| Tartaric acid | Approx. 8 |
| Sodium bicarbonate | Approx. 20 |

These substances may be mixed as dry powders and pressed into a single tablet 29 which dissolves in an aqueous solution in the tank. However, if desired, separate tablets of each substance may be provided and added separately to the tank.

It will be appreciated that the concentrations and materials used in this specific mixture may be relatively widely varied in accordance with the foregoing disclosure. Also, if desired, potassium carbonate in the amount of approximately 18 parts by weight may be added to the above solution to increase the volume of gas generated and consequently its pressure. Also, sodium carbonate may be substituted for the sodium bicarbonate of the example.

The actual gas pressure necessary to satisfactorily deliver cleaning fluid to the surface through the fluid delivery system 18, 19, 22 and 23, will vary with the size of the tank 13, the area on which the fluid is to be sprayed, the force with which it is desired to spray the fluid, and other factors. It has been found that any pressures from about 10 lbs. to about 200 lbs. per square inch are suitable depending on circumstances, and may be generated by using suitable amounts of my gas-generating substance. One skilled in the art may readily determine the pressures best suited to the intended purpose and the amounts and nature of gas-generating substance or substances required to produce such pressures.

If desired, additional ingredients adapted to lower the freezing point of the solution may be added to the gas-generating substance. It will be appreciated that the gas-generating substance itself tends to lower somewhat the freezing point of an aqueous solution to which it is added, since it contains substances, such as sodium bicarbonate, which will ionize and thus lower the freezing point of the solution a definitely known amount for each gram molecule added. However, in order to lower the freezing point of the cleaning solution sufficiently to prevent or retard freezing of the solution during cold weather, it is desirable to add other so-called "antifreezing" ingredients to the gas-generating substance. These ingredients may be any suitable antifreeze compound miscible with or capable of dissolving in the aqueous solution employed. Preferably it is a compound capable of ionizing in the aqueous solution to produce the relatively large number of ions as such substances are most effective in lowering the freezing point of the resultant solution. Examples of such substances are potassium nitrate, potassium carbonate, and similar salts.

By way of example, a mixture of dry powders containing:

| | Parts by weight |
|---|---|
| Magnesium sulfate | Approx. 30 |
| Sodium bicarbonate | Approx. 4 |
| Tartaric acid | Approx. 4 |
| Potassium carbonate | Approx. 18 | may be pressed into a tablet which, when dissolved to form an aqueous solution in the tank 13, produces a gas-generating substance which also lowers the freezing point of the solution therein. If desired, the powders may be separately compressed and added separately to the solution.

If it is desired to lower the freezing point of the solution by means other than the addition of my gas-generating substance, this also can be accomplished. For instance, suitable soluble compounds especially compounds which ionize, may be dissolved in the solution instead of being added to the gas-generating substance. However, it is preferable to add one of several well-known substances for lowering the freezing point of an aqueous solution and commonly called anti-freezing materials. Glycerin, for example, is useful for this purpose. Also, suitable alcohols and various compounds may be used which are soluble in, or miscible with water to form a mixture of water and the diluting substance which will not solidify under the temperatures commonly encountered under normal operating conditions. Butyl alcohol or ethyl alcohol is also suitable for the purpose, as is a 10% solution of nitrocellulose in alcohol.

A specific anti-freeze solution suitable for use with the present invention is, by way of illustration and not of limitation, as follows:

| | Parts by weight |
|---|---|
| Glycerin | Approx. 55 |
| Ethyl alcohol | Approx. 62 |
| Water | Approx. 100 |

This solution will not freeze at temperatures above 20° below zero F. and may be mixed in the tank 13 prior to adding the gas-generating materials thereto.

From the foregoing it will be apparent that the essential feature is the supplying of the fluid under pressure to jets, nozzles, or a wiper blade disposed adjacent the surface to be cleaned. The flow of fluid is controlled in each instance by a suitable valve means, preferably manually actuated from the interior of the vehicle. The action of the vehicle in motion causes a vibration of the tank or container and agitation of the contents therein.

Features disclosed but not claimed herein are being claimed in my co-pending applications Serial No. 437,165, filed April 1, 1942; Serial No. 437,166, filed April 1, 1942; and Serial No. 437,167, filed April 1, 1942.

I claim:

1. In a device adapted to supply a fluid to assist in removing accumulated materials from the surface of a motor vehicle windshield, a fluid storage container having a fluid stored therein under a predetermined gas pressure, means for increasing said gas pressure including a removable cartridge detachably connected with said container and adapted to discharge a gas under pressure into said container, conduits leading therefrom and terminating at points adjacent a windshield wiper blade, and a valve for controlling the flow of fluid from said container through said conduits.

2. In a windshield cleaning device for a motor vehicle, a liquid container having a conduit terminating adjacent a windshield wiper blade adapted to engage and move relative to a vehicle windshield, a closure member adapted in an operative position to close the container and render it substantially fluid-tight, a cleaning solution in the container, means comprising a cartridge detachably connected to the container and adapted to discharge into the container a gas under pressure to subject the cleaning fluid in the container to substantially constant pressure, conduits leading from the container and terminating at the windshield adjacent the windshield wiper, and valve means for controlling the flow of fluid through the conduits from the container.

CLIFFORD R. CARNEY.